United States Patent [19]
Spanjersberg

[11] 3,930,228
[45] Dec. 30, 1975

[54] METHOD AND DEVICE FOR READING CHARACTERS, PREFERABLY DIGITS

[75] Inventor: Arie Adriaan Spanjersberg, Leiderdorp, Netherlands

[73] Assignee: De Staat der Nederlanden, te dezen Vertegenwoordigd Door de Directeur-Generaal der Posterijen, Telegrafie en Telefonie, The Hague, Netherlands

[22] Filed: Feb. 11, 1974

[21] Appl. No.: 441,431

[30] Foreign Application Priority Data

Feb. 21, 1973 Netherlands ...................... 7302410

[52] U.S. Cl. ...................................... 340/146.3 SG
[51] Int. Cl.² ........................................ G06K 9/10
[58] Field of Search ........... 340/146.3 SG, 146.3 H, 340/146.3 AC

[56] References Cited

UNITED STATES PATENTS

| | | | |
|---|---|---|---|
| 3,264,608 | 8/1966 | Gattner et al. | 340/146.3 H |
| 3,517,387 | 6/1970 | Andrews et al. | 340/146.3 SG |
| 3,587,047 | 6/1971 | Cutaia | 340/146.3 H |
| 3,694,807 | 9/1972 | Bond et al. | 340/146.3 SG |

*Primary Examiner*—Leo H. Boudreau

[57] ABSTRACT

Method and device for reading hand-written characters placed in squares, each serving for one character, which squares border each other and are projected on a matrix. A cameratube serves as scanner of the matrices. The area scanned is larger than the area of the square, which makes it possible to bring about a geometrical separation between the characters that overstep the border lines, of its square resulting in a better recognition of the characters.

8 Claims, 5 Drawing Figures

METHOD AND DEVICE FOR READING CHARACTERS, PREFERABLY DIGITS

An auxiliary memory is provided for storing the scanned results from the margins on each side of the border line of the square, and a processor is provided for processing the information of this memory. This processor comprises horizontal and vertical dividers, a shift register, counters, and logic circuits of AND- and OR-gates, and triggers in order to determine which character parts cross the border lines and from which side, and to what they are joined including rejection of characters that have more than three separately parts in the margin area or have a part that completely crosses the margin area. - -

BACKGROUND OF THE INVENTION

In a known system of the same kind as the present invention, it is a problem to bring about a geometrical separation of the characters, when parts of a written character overstep the border lines of the squares. Hitherto a solution to this problem has not been found, so that the information outside the borders of the squares gets lost. Moreover, the said overstepping of the border lines of a square causes a disturbance of the information in the adjacent square. In this respect it is essential that measures are taken to remove the information of the disturbing character parts before proceeding with the recognition of the character supposed only to be in that square.

SUMMARY OF THE INVENTION

The invention provides a solution to the problem posed, because the area to be scanned is larger than the area bordered by the nominal position of the outer border lines of the squares. Thus each square together with a surrounding marginal strip is scanned, and a geometrical separation is brought about between characters that overstep the border lines of the squares, by regarding each enlarged square for all of each character. The information of those character parts in this marginal strip that form a connection with the character in the square, is added to the memory and the other parts of the marginal strip are disregarded or erased from the memory. If, by way of example, each square corresponds to a matrix of $32 \times 32$ equal bits, a marginal strip around the outside of the square corresponding to a width of 8 bits is also regarded. If this marginal strip contains character parts belonging to the character in the square, then the information of these character parts has to be added to the information of the square stored in the memory. Preferably, the margin together with the adjacent 8-bit margin strip on the inside of the border line is regarded separately, whereby the information of the character parts not belonging to the character in the square, is not passed on the memory. Consequently, the probability of recognizing the digit is considerably increased.

It is advisable to count the projections of the number of separate character parts occurring in the said separately-regarded 16-bit area and, if this number amounts to more than three, to consider the bit patterns geometrically inseparable. This situation very seldom occurs with characters that are written in a normal way. It often occurs that these cases are also illegible for the human eye, so that for the sake of simplicity, it is justified to leave these cases out of consideration. For the same reason bit patterns can be considered geometrically inseparable, if the same character part not only crosses the border line of the square, but also the outer lines of the 16-bit regarded marginal area that is a character part that extends clear across this whole area.

The invention also relates to a device or apparatus for carrying out this method or process, in which case there are provided: an auxiliary memory for temporarily storing the information of the outside marginal strip and the adjacent marginal area the inside of the border line; that is, the 16-bit regarded area. To this auxiliary memory are connected two cascaded circuits, one for the *m* or 48 steps along the vertical line and one for the *n* or 16 steps along the horizontal line of the said areas regarded; and a cycle counter for counting five cycles. The first cycle Cl is for the $m \times n$ steps and the reading-in of the auxiliary memory. The second cycle C2 is for detecting character parts in the regarded area by means of an *m*-bit shift register. The third cycle C3 is indicating, by means of a counter, the number of projections of character parts in the regarded area during the scanning of the outer border of the area regarded within the square, which counter can be restored to normal after each of the n steps. The fourth cycle C4 is for the erasing operations of the parts to be disregarded; and the fifth cycle C5 is for transferring the information from the auxiliary memory to the character reading or processor memory.

The above-mentioned procedure takes place for each of the four border areas of the four sides of a square.

OBJECTS AND ADVANTAGES

It is an advantage of this invention that a rather sharp line is drawn between legible and illegible characters that overstep and/or overlap the border lines whereby the percentage of the illegible characters is limited. Thus the percentage of legible characters is considered increased while the possibility of errors with illegible characters is considered reduced.

Thus it is an object of this invention to bring about a geometrical separation between the characters written in various squares, even if character parts overstep and/or overlap the nominal border lines between the squares, by considering each square together with a predetermined surrounding strip inside and outside of the sides or border lines of each square.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. 1 is a sample of one group of two adjacent lines of eight adjacent squares on a document with the outer margin areas scanned by the video camera for the group and one of the squares therein being shown in dotted lines, and a schematic connection of the output of this video camera scanner connected to the circuit of this invention before the characters scanned in these squares are processed;

FIG. 2 shows one square of the pattern of FIG. 1 containing written digits therein, which digits overlap or overstep the border lines of that square, with the areas for the two vertical marginal strips and adjacent margins inside the square that compose the regarded area considered by the process and apparatus of this invention being shaded, plus the side projection strips of the joined character parts detected in each of these shaded areas;

Figure 1:
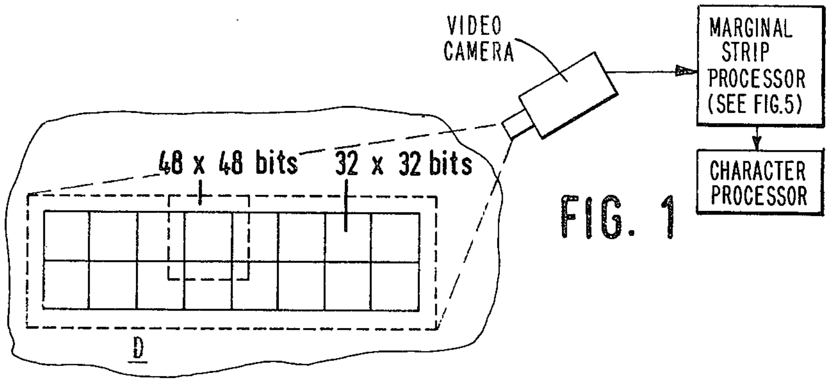

The partition of a square according to FIG. 1 shows 2 × 8 adjacent squares and a document D. Each square can and should contain only one written digit, and each square corresponds to a matrix of 32 × 32 equals bits. The area scanned is larger than the area indicated by the nominal positions of the outer full-line border lines of each square by an additional dotted-line outlined marginal strip, 8 bits in width, surrounding the full-line border line or partition line of each square.

Figure 2:
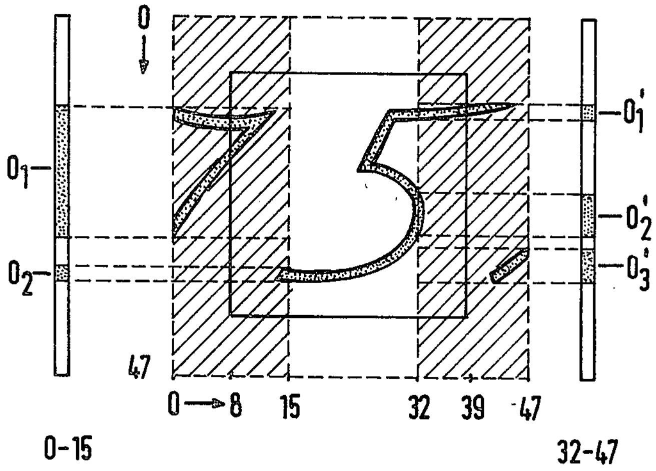

FIG. 2 shows an example of one square, the nominal border lines of which are drawn in full line. The rows (horizontal) and columns (vertical) in the matrix of 48 × 48 bits which are considered or regarded for each border line of the squares, and are numbered from 0 to 47. The nominal positions of the vertical border lines are represented by the columns 8 and 39.

Figure 3:
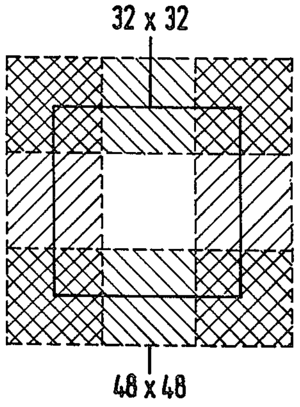
FIG. 3 is a square with all four of the border areas considered by the process and apparatus of this invention being cross-hatched.

FIG. 3 shows a square of 32 × 32 bits with all four border strips of 48 × 16 bits marginal areas being regarded by the process and apparatus of this invention.

In order to effect a geometrical separation in a horizontal direction, the border strip and margin on the left and on the right of the columns 8 and 39 are regarded. These border strips relate to a marginal strip of 8 bits on the outside of the square and an adjacent border margins of 8 bits on the inside of the border line of the square. Thus the border strips and margins considered in this invention relate to the areas between the columns 0 – 15, 32 – 47, respectively, which they are indicated by the same angled hatching lines in FIGS. 2 and 3.

In carrying out this invention, the OR-functions in these hatched border strips and margins are determined, by what could be called the horizontal projections of character parts occurring therein and to determine the minimum number of the said character parts in each of said regarded areas. The projections of the character parts occurring in both hatched border strips and margins or regarded areas are shown in FIG. 2 in the two vertical side strips and are indicated by $\mathbf{0}_1$ and $\mathbf{0}_2$ for the left-hand strip and by $\mathbf{0}'_1$, $\mathbf{0}'_2$ and $\mathbf{0}'_3$ for the right-hand strip. If the number of these 0 projections amounts to more than three, the bit patterns have to be considered geometrically inseparable, and illegible by the method and apparatus of this invention.

Two bit patterns are also geometrically inseparable, if within the same 0-area of the OR-function, character parts occur in each of the three columns 0, 8 and 15 (left-hand border strip), or columns 32, 39 and 47 (right-hand border strip) i.e., if a character part extends across the whole width of the regarded area.

The table mentioned below gives a survey of the possibilities and the operations to be carried out for the border strip or the regarded area 0 – 15 within one 0-area. The occurrence of character parts in the columns 0, 8 and 15 is indicated by $k_o = \mathbf{1}$, $k_8 = \mathbf{1}$ and $k_{15} = \mathbf{1}$, respectively.

Figure 4:
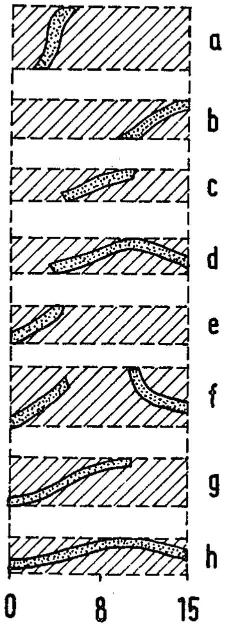
FIG. 4 shows some examples of marks or parts of characters that can occur in a left vertical marginal area that is considered or regarded by the method and apparatus of this invention.
Figure 5:
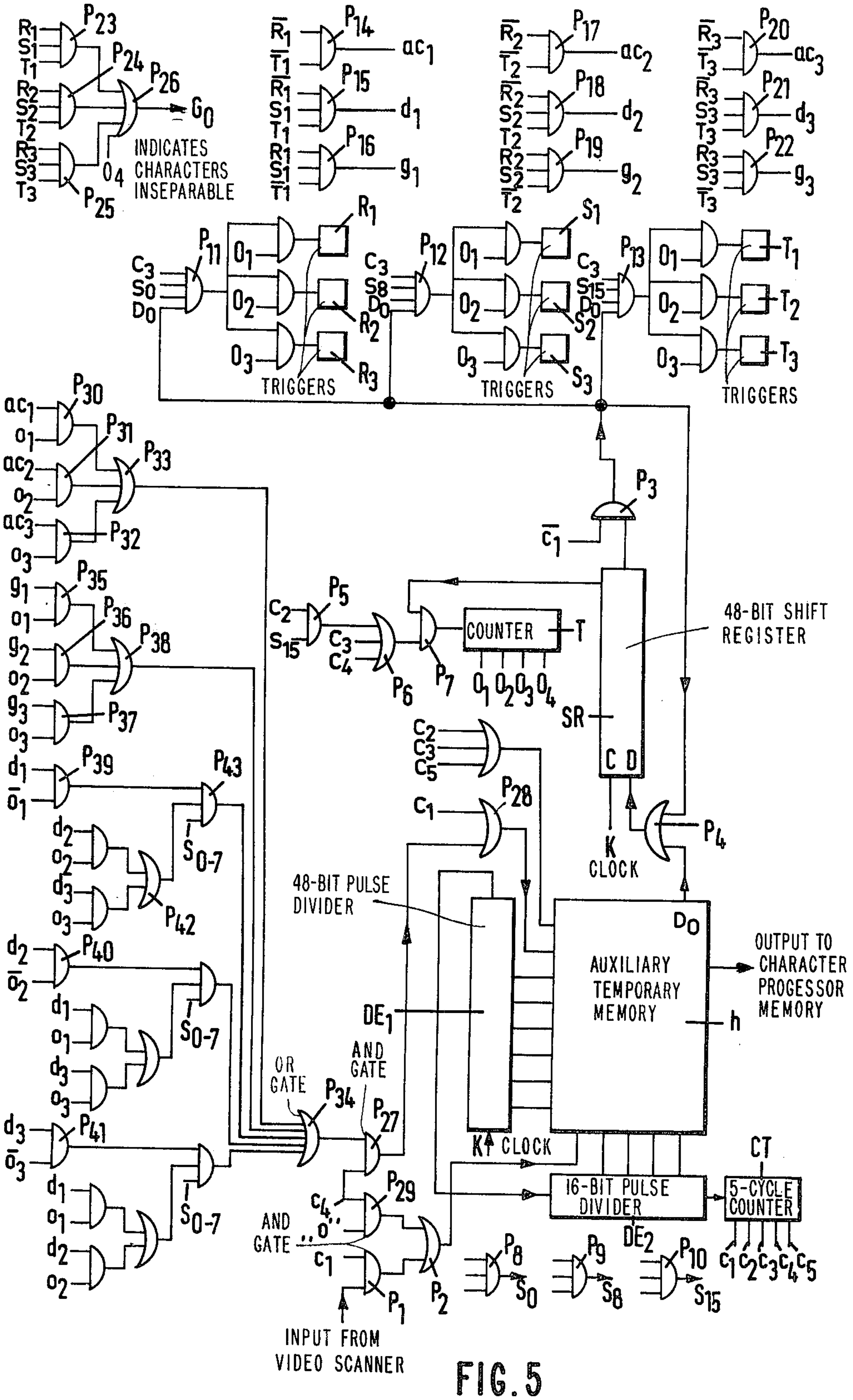
FIG. 5 is a schematic detached block wiring diagram of one embodiment of an apparatus for carrying out the process or method of this invention.

| $k_o$ | $k_8$ | $k_{15}$ | operation to be carried out according to FIG. 5 | see FIG. 4 |
|---|---|---|---|---|
| 0 | 0 | 0 | erasure of information of columns 0 to 15 within 0-area | a |
| 0 | 0 | 1 | not to be erased | b |
| 0 | 1 | 0 | erasure of columns 0 to 15 within 0-area | c |
| 0 | 1 | 1 | erasure of columns 0 to 7 outside 0-area; border to be shifted to column 0 | d |
| 1 | 0 | 0 | not to be erased | e |
| 1 | 0 | 1 | not to be erased | f |
| 1 | 1 | 0 | erasure of columns 0 to 15 within 0-area | g |
| 1 | 1 | 1 | bit patterns geometrically inseparable | h |

II The Apparatus

The method of this invention deals with each of the four hatched margin areas, two vertical and two horizontal, as indicated by the hatchings in FIG. 3; and FIG. 5 is a schematic detached wiring diagram of a circuit for considering one of these four hatched areas. This circuit comprises primarily a 48 × 16 bit auxiliary memory H for temporarily storing the information of a border strip and margin or regarded area. A 48-step pulse divider $DE_1$ and a 16-step pulse divider $DE_2$ have been provided for addressing the memory positions in the auxiliary memory H. The pulse dividers $DE_1$ (48 or m vertical steps) and $DE_2$(16 or n horizontal steps) are cascaded. A clock connection is indicated by K to divider $DE_1$ . One cycle of the process is completed in 48 × 16 steps. The whole process consists of five consecutive cycles $C_1$, $C_2$, $C_3$, $C_4$ and $C_5$. The position of a cycle counter CT connected to divider $DE_2$ indicates which cycle is in progress.

During the cycle $C_1$, the information of one border regarded area is read in into the 48 × 16 bit auxiliary memory H. Via an AND-gate $P_1$ and an OR-gate $P_2$ (shown at bottom of FIG. 5) the information is applied to the data input terminal of the auxiliary memory H.

During the cycle $C_2$, the OR-function of all image elements occurring in the *n* columns of the border strip and margin or regarded area is determined in a 48-bit shift register SR (see center of FIG. 5). In order to achieve this at the beginning of cycle $C_2$ the shift register SR is empty, and the AND gate $P_3$ is blocked during the cycle $C_1$, so that, via an OR-gate $P_4$, only the information with a logical 0-value is presented to the data input terminal of the shift register SR.

The number of areas containing joined image elements in the OR function of the regarded area is determined by a counter T.

By means of the gates AND-gate $P_5$, OR-gate $P_6$ and AND-gate $P_7$ (see center FIG. 5), it is achieved that the counter T can indicate the said areas during column 15 of cycle $C_2$, and also during the cycles $C_3$ and $C_4$. At the beginning of each column the counter T is restored to normal. It is evident that also the OR-function occurring in the shift register SR during the cycles $C_2$ to $C_5$ is cyclically shifted around.

During the cycle $C_3$, it is examined if there are image elements in the columns 0, 8 and 15 during the various 0-areas of the OR-function. The output terminals $S_o$, $S_8$ and $S_{15}$ of the AND gates $P_8$, $P_9$ and $P_{10}$ (see bottom of FIG. 5) indicate these three columns. The polarity of AND-gate $P_{11}$ (see upper third of FIG. 5) changes when during the cycle $C_3$, column 0, the data-out signal $D_0$ of the auxiliary memory H (via AND-gate $P_3$) signals the information image element at the same time when the information image element appears at the output terminal of the shift register SR. The same operations for the columns 8 and 15 are carried out by the AND-gates $P_{12}$ and $P_{13}$.

If the polarity of the gate $P_{11}$ has changed, one of the triggers $R_1$, $R_2$ or $R_3$, dependent on the position of the counter T, is changed over. In this connection the triggers $S_1$, $S_2$, $S_3$ and $T_1$, $T_2$, $T_3$, respectively, apply to the columns 8 and 15.

The output terminals of the AND-gates $P_{14}$, $P_{15}$ and $P_{16}$ (see near top center of FIG. 5) indicate which operation has to be carried out in accordance with the above Table. This relates to the information within the first 0-area ($0_1$) or $0'_1$ (see side strip in FIG. 2) of the ORfunction indicated by the out-put terminal $ac_1$, $d_1$ and $g_1$. This same information is indicated by the output terminals $ac_2$, $d_2$ and $g_2$ for the second 0-area ($0_2$or $0'_2$) and by the output terminals $ac_3$, $d_3$ and $g_3$ for the third 0-area ($O_3$ (not shown) or $0'_3$).

If within one 0-area all of the columns 0, 8 and 15 contain image elements, the triggers $R_{1\text{-}3}$, $S_{1\text{-}3}$ and $T_{1\text{-}3}$, belonging to the relevant 0-area, have changed over. This result is detected by the gates $P_{23}$, $P_{24}$ and $P_{25}$ (see upper left FIG. 5). If this situation occurs within one or more of the 0-areas, an output terminal $G_0$ is activated by means of an OR-gate $P_{26}$. If the polarity of the output terminal $G_0$ changes, this indicates that the relevant bit patterns are geometrically inseparable.

During the cycle $C_4$, the erasing operation is carried out in accordance with the above table.

If one or more of the AND-gates $P_{14}$, $P_{17}$or $P_{20}$ have been activated, this indicates an isolated length of line within the border strip. During the erasing cycle $C_4$ this information is erased. Thus, during the cycle $C_4$ the output of an OR-gate $P_{27}$ (see lower left of FIG. 5) can cause, via an OR-gate $P_{28}$, the presented data to be recorded in the auxiliary memory H. The information presented via a gate $P_{29}$ during the cycle $C_4$ has the 0-value.

If during the first 0-area ($0'_1$) of the OR-function the situation $ac_1$ occurs, the AND-gates $P_{30}$ and $P_{27}$, the latter via the OR-gates $P_{33}$ and $P_{34}$, are activated, as a result of which the relevant information is erased from the memory. This operation takes place for all the columns of the border strip, however, only within the relevant or $0'_1$-area. The AND-gates $P_{31}$ and $P_{32}$ are provided for the 0-areas $0_2$ or $0'_2$ and $0_3$ (not shown) or $0'_3$, respectively.

If the situation *g* (see the above Table and FIG. 4) occurs, this indicates a penetration of a character part from a neighbouring square. The relevant 0-area is then marked by the output polarity of the AND-gates $P_{35}$, $P_{36}$ and $P_{37}$, respectively. By means of an OR-gate $P_{38}$ it is achieved that, when the situation g occurs, erasure will take place in each of the 0-areas in the columns 0 to 15.

If the situation d (see also Table and FIG. 4) occurs, the border line has to be shifted outwards, so to speak, (column 0). Erasure has then to take place in the columns 0 to 7 outside the relevant 0-area provided there are no other 0-areas in which the situation d occurs. The situation d in the 0-rate $0_1$ is indicated by means of an AND-gate $P_{39}$. The output of an OR-gate $P_{42}$ indicates whether the situation d also occurs in the 0-areas $0_2$ or $0_3$. The output polarity of an AND-gate $P_{43}$ indicates during which periods erasure has to take place in the columns 0 to 7. Analogous circuits have been provided for the or $0'_2$ and $0_3$ or $0'_3$-areas.

After one border strip, the width of 15 columns, has been dealt with, the information then stored in the auxiliary memory H is transferred to the character processor during the cycle $C_5$, after which a following border strip of the relevant square can be dealt with.

The reading-in of the information into the auxiliary memory H during the cycle $C_1$ has always to take place in such a way that the outer side of the 48 × 48 matrix is located in position $S_0$ of the auxiliary memory H, and the horizontal sides of the square with 48 columns and 16 rows are considered as 48 rows and 16 columns by the same apparatus as shown in FIG. 5.

While there is described above the principles of this invention in connection with specific apparatus, it is to be clearly understood that this description is made only by way of example and not as a limitation to the scope of this invention.

What is claimed is:

1. A method for reading hand written characters in predetermined squares marked on a document comprising electronically scanning said characters, said system comprising:

A. scanning predetermined marginal strips on each side of the border lines of said squares, B. recording the character parts scanned in said strips in an auxiliary memory for processing before transfer to a character processor, C. erasing for a given character those recorded parts which are not connected to said given character in said square inside strip, D. adding those recorded parts of said given character in said strip to said given character which cross the border lines of said square, and E. indicating the presence of more than three separate recorded parts in each said marginal side strip.

2. A method for reading hand written characters in predetermined squares marked on a document comprising electronically scanning said characters, said system comprising:

A. scanning predetermined marginal strips on each side of the border lines of said squares, B. recording the character parts scanned in said strips in an auxiliary memory for processing before transfer to a character processor, C. erasing for a given character those recorded parts which are not connected to said given character in said square inside said strip, D. adding those recorded parts of said given character in said strip to said given character which cross the border lines of said square, and E. indicating joined recorded parts which completely cross said strips.

3. A method for reading characters in squares on a document comprising:

A. electronically scanning predetermined border areas on each side of the border lines of said squares to determine the marks occurring in said areas, B. recording the scanning results from said marks in said areas in an auxiliary memory, C. processing said recorded results from said auxiliary memory to determine:

1. the joined marks which cross the border line of said square from inside said square, 2. the joined marks which cross the side of the border line of said square from outside of said square, and 3. the joined marks that are not connected outside the said area, D. adding the determined marks detected outside said square to their connecting marks inside said square, E. erasing the determined marks detected inside the area connected to marks outside said square and the detected marks not connected to any marks outside said area, and F. transferring the resulting data from said auxiliary memory to a character processor.

4. A method according to claim 3 wherein said processing of said recorded results in said auxiliary memory also includes:

4. the number of joined marks detected in each area, and 5. the joined marks which completely traverse said area, and G. indicating the present of more than three joined marks in each area and the presence of a mark that completely traverses said area.

5. A system for reading characters written in predetermined squares on a document by electronically scanning said document, said system comprising:

A. an auxiliary memory means for recording the parts of characters scanned in predetermined strips on each side of the border lines of said squares, B. shift register means connected to said auxiliary memory means for determining the number of joined parts of said characters recorded in each side strips, C. first logic circuit means connected to said register means for determining the joined parts that cross the border lines of said strips and the border lines of said squares, D. second logic circuit means for erasing the joined character parts that only cross the outside border lines of said strips, E. third logic circuit means for erasing (1) only the joined character parts that cross the border lines of said squares, (2) the parts that cross both the border lines of said square and the outside border lines of said strips, and (3) the joined character parts which cross none of the border lines of said strips and squares in said strips, and F. fourth logic circuit means for adding to the characters the joined character parts in said strips that only cross the inside border lines of said strips and the border lines of said squares in said strips.

6. A system according to claim 5 including counter means for indicating more than three separate joined character parts in any one side border strip for a given character.

7. A system according to claim 5 including means for indicating joined character parts that cross both border lines of said strips and the border lines of said squares.

8. A system for reading characters written in predetermined squares on a document by electronically scanning said document, said system comprising:

A. an auxiliary memory for temporarily storing the information of predetermined marginal strips m-steps long vertically and n-steps wide horizontally, which strips extend on each side of each border line of said squares, B. two cascaded circuits connected to said auxiliary memory for m-steps along the vertical and n-steps along the horizontal lines of each of said marginal strips, C. a cycle counter connected to said n-step cascaded circuit for counting five cycles during the first of which cycles said m and n-steps are read into said auxiliary memory, D. an m-bit shift register connected to said auxiliary memory for detecting character parts in said marginal strips during the second cycle of said cycle counter, E. a counter connected to said m-bit shift register for indicating the number of character parts detected in said marginal strips during the scanning of the border line of said strips inside said squares, operated during said third cycle of said cycle counter, which cycle counter is restored to normal after each n-steps by connection to said cycle counter, F. first logic circuit means connected to said auxiliary memory, said cycle counter, and said n-step cascaded circuits for erasing certain of said character parts from said auxiliary memory during the fourth cycle of said cycle counter, and G. second logic circuit means connected to said auxiliary memory and said first logic circuit means for adding certain of said character marks to marks already in said auxiliary memory during the fourth cycle of said cycle counter, and H. means connected to said cycle counter for transferring the resulting processed information from said auxiliary memory to the memory of a character processing circuit.

* * * * *

UNITED STATES PATENT OFFICE
CERTIFICATE OF CORRECTION

PATENT NO. : 3,930,228

DATED : Dec. 30, 1975

INVENTOR(S) : Arie Adriaan SPANJERSBERG

It is certified that error appears in the above-identified patent and that said Letters Patent are hereby corrected as shown below:

| | |
|---|---|
| Column 1, line 14, | change "separately" to - - separate - - |
| Column 2, line 10, | after "area" insert - - on - - |
| Column 2, line 19, | after "is" insert - - for - - |
| Column 3, line 16, | change "equals" to - - equal - - |
| Column 3, line 40, | cancel "they" |
| Column 3, line 45, | after "what" insert - - herein - - |
| Column 4, line 41, | after "bottom" insert - - center - - |
| Column 4, line 55, | cancel "gates" |
| Column 5, line 26, | before "gates" insert - - AND- - - |
| Column 5, line 65, | change "rate" to - - area - - |
| Column 6, line 2, | after "the" insert - - $0_2$ - - |
| Column 7, line 3, | change "the" to - - of - - |

Signed and Sealed this

*twentieth* Day of *April 1976*

[SEAL]

*Attest:*

RUTH C. MASON
*Attesting Officer*

C. MARSHALL DANN
*Commissioner of Patents and Trademarks*